United States Patent
Li et al.

(10) Patent No.: US 11,834,351 B1
(45) Date of Patent: Dec. 5, 2023

(54) COMPOSITE HYDROGEL SPONGE AND ITS PREPARATION METHOD AND APPLICATION, SOLAR DESALINATION DEVICE

(71) Applicant: Guangdong Ocean University, Zhanjiang (CN)

(72) Inventors: Lefan Li, Zhanjiang (CN); Zhang Hu, Zhanjiang (CN); Jingyuan Guo, Guangzhou (CN); Tuanzhang Li, Shantou (CN); Wenhua Wang, Zhanjiang (CN); Chengyong Li, Zhanjiang (CN); Di Wang, Zhanjiang (CN); Chengpeng Li, Zhanjiang (CN); Sidong Li, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 18/327,889

(22) Filed: Jun. 2, 2023

Related U.S. Application Data

(63) Continuation of application No. PCT/CN2022/119347, filed on Sep. 16, 2022.

(30) Foreign Application Priority Data

Jul. 13, 2022 (CN) .......................... 202210817605.4

(51) Int. Cl.
*C02F 1/14* (2023.01)
*C08J 3/075* (2006.01)
(Continued)

(52) U.S. Cl.
CPC ................ *C02F 1/14* (2013.01); *C08J 3/075* (2013.01); *C08K 3/042* (2017.05);
(Continued)

(58) Field of Classification Search
CPC .. C02F 1/14; C02F 2103/08; C02F 2201/002; C08J 3/075; C08J 2333/26; C08K 3/042
See application file for complete search history.

(56) References Cited

FOREIGN PATENT DOCUMENTS

| | | | | |
|---|---|---|---|---|
| CN | 110218277 A | * | 9/2019 | ............ C08F 220/56 |
| CN | 110218277 A | | 9/2019 | |

(Continued)

OTHER PUBLICATIONS

CNIPA, Notification of a First Office Action for CN202210817605. 4, Aug. 24, 2022.
(Continued)

*Primary Examiner* — Waqaas Ali
(74) *Attorney, Agent, or Firm* — Zhigang Ma

(57) ABSTRACT

A composite hydrogel sponge and its preparation method and application, and a solar desalination device are provided. The composite hydrogel sponge includes a water supply layer and an evaporation layer disposed on the water supply layer. A material of the water supply layer is polyacrylamide hydrogel, and a material of the evaporation layer is polyacrylamide/graphene composite hydrogel. The polyacrylamide/graphene composite hydrogel includes the polyacrylamide hydrogel and the graphene dispersed in the polyacrylamide hydrogel. The composite hydrogel sponge has a special porous structure of the sponge, which is beneficial to the rapid transmission and supply of water; meanwhile, the graphene on the surface of the evaporation layer can fully receive solar energy to achieve higher photothermal conversion efficiency.

7 Claims, 1 Drawing Sheet

(51) Int. Cl.
    *C08K 3/04*         (2006.01)
    *C02F 103/08*     (2006.01)

(52) U.S. Cl.
    CPC .... *C02F 2103/08* (2013.01); *C02F 2201/002* (2013.01); *C08J 2333/26* (2013.01)

(56) References Cited

FOREIGN PATENT DOCUMENTS

| | | | | |
|---|---|---|---|---|
| CN | 111961229 A | * | 11/2020 | .......... B01J 13/0056 |
| CN | 111961229 A | | 11/2020 | |

OTHER PUBLICATIONS

Guangdong Ocean University (Applicant), Reply to Notification of a First Office Action for CN202210817605.4, w/ (allowed) replacement claims, dated Aug. 29, 2022.

CNIPA, Notification to grant patent right for invention in CN202210817605.4, Sep. 1, 2022.

* cited by examiner

COMPOSITE HYDROGEL SPONGE AND ITS PREPARATION METHOD AND APPLICATION, SOLAR DESALINATION DEVICE

TECHNICAL FIELD

The disclosure relates to the technical field of seawater desalination, in particular to a composite hydrogel sponge and its preparation method and application, and a solar desalination device.

BACKGROUND

In the past decades, people have proposed various water treatment technologies, which are generally divided into primary technologies (screening, filtration, centrifugation, separation, sedimentation, coagulation and flocculation, etc.), secondary technologies (aerobic and anaerobic treatment, etc.), and tertiary technologies (distillation, crystallization, evaporation, solvent extraction, oxidation, precipitation, ion exchange, reverse osmosis, nanofiltration, ultrafiltration, microfiltration, adsorption, electrolysis and electrodialysis, etc.). However, most of these technologies are unable to effectively discharge water pollutants and have serious impacts on carbon dioxide emissions. Some methods are energy-intensive and operation-intensive, making them unbearable in commercial applications. Reducing the energy consumption and infrastructure costs of existing seawater desalination technologies and achieving carbon free emissions remains a challenge. If the desalination industry is combined with renewable energy, such as wind energy, solar energy, tidal energy and geothermal energy, the desalination industry can achieve sustainable development.

At present, solar-powered water evaporation has been widely studied as a classic solar thermal process since it plays an important role in steam generation, desalination, sterilization, and water treatment, and has become one of hot topics in the current research. However, the existing solar desalination technologies have low evaporation rate and efficiency, making it difficult to meet the current demand for solar desalination.

SUMMARY

A purpose of the disclosure is to provide a composite hydrogel sponge and its preparation method and application, and a solar desalination device. The composite hydrogel sponge has high photo-thermal conversion efficiency, thereby improving an evaporation rate and evaporation efficiency.

In order to achieve the above purpose, the disclosure provides following technical solutions.

A composite hydrogel sponge provided by the disclosure, including a water supply layer and an evaporation layer disposed on the water supply;

a material of the water supply layer is polyacrylamide hydrogel;

a material of the evaporation layer is polyacrylamide/graphene composite hydrogel; and the polyacrylamide/graphene composite hydrogel includes polyacrylamide hydrogel and graphene dispersed in the polyacrylamide hydrogel.

In an embodiment, a mass ratio of the graphene to the polyacrylamide in the evaporation layer is (0.90~1.35):(12~18).

In an embodiment, a particle size of the graphene in the evaporation layer is in a range of 0.40 nanometers (nm) to 10.00 nm.

In an embodiment, the disclosure further provides a preparation method of the composite hydrogel sponge in the above technical solutions, including:

mixing a first acrylamide, a first initiator, a first co-initiator, a first cross-linking agent and first water to obtain a first mixture, then performing first in-situ polymerization on the first mixture in a mold to obtain a polyacrylamide hydrogel layer; and mixing a second acrylamide, a second initiator, a second co-initiator, a second cross-linking agent, the graphene and second water to obtain a second mixture, then performing second in-situ polymerization on the second mixture on an upper surface of the polyacrylamide hydrogel layer to obtain a polyacrylamide/graphene composite hydrogel layer, thereby obtaining the composite hydrogel sponge.

In an embodiment, a mass ratio of the first acrylamide:the first water:the first initiator:the first co-initiator:the first cross-linking agent is (12~18):(80~480):(0.04~0.14):(0.04~0.14):(0.0015~0.15); and a mass ratio of the graphene:the second acrylamide:the second water:the second initiator:the second co-initiator:the second cross-linking agent is (0.90~1.35):(12~18):(80~418):(0.04~0.14):(0.04~0.14):(0.0015~0.015).

In an embodiment, a temperature of performing the first in-situ polymerization is in a range of 35 Celsius degrees (° C.)~85° C. and a duration of performing the first in-situ polymerization is in a range of 15 minutes (min)~80 min, and a temperature of performing the second in-situ polymerization is in a range of 35° C.~85° C. and a duration of performing the second in-situ polymerization is in a range of 15 min~80 min.

The disclosure further provides the application of the composite hydrogel sponge of the technical solutions or the composite hydrogel sponge prepared by the preparation method of the technical solutions in the field of seawater desalination.

The disclosure further provides a solar desalination device including a focusing system, a first convex lens, and a solar evaporator. The focusing system is configured to reflect light to irradiate onto the solar evaporator through the first convex lens.

The focusing system includes a concave mirror, a second convex lens and a plane mirror sequentially arranged from bottom to top; centers of the concave mirror, the second convex lens and the plane mirror are located on a same straight line, and the straight line is perpendicular to a horizontal plane.

The solar evaporator includes the composite hydrogel sponge of the above technical solutions or the composite hydrogel sponge prepared by the preparation method of the above technical solutions, an inverted V-shaped transparent glass cover and a stand. The stand includes a seawater area located in a middle and a freshwater collection area located at two ends, and the composite hydrogel sponge is configured to float on a seawater surface of the seawater area.

In an embodiment, a diameter of the concave mirror is 3~10 times of a diameter of the composite hydrogel sponge.

In an embodiment, a curvature radius of the concave mirror is ⅔~1 times of a length of an optical axis between a vertex of the concave mirror and the composite hydrogel sponge.

In an embodiment, the second convex lens is located at a height of ⅓~½ times of the curvature radius of the concave mirror.

In an embodiment, a diameter of the first convex lens is 1.2~1.3 times of a diameter of the light reflected by the focusing system.

In an embodiment, a thickness of the composite hydrogel sponge is 5.05 millimeters (mm), and a height of the composite hydrogel sponge soaked in seawater is in a range of 2 mm~4 mm.

The disclosure provides a composite hydrogel sponge including a water supply layer and an evaporation layer disposed on the water supply layer. A material of the water supply layer is polyacrylamide hydrogel, and a material of the evaporation layer is polyacrylamide/graphene composite hydrogel. The polyacrylamide/graphene composite hydrogel includes the polyacrylamide hydrogel and the graphene dispersed in the polyacrylamide hydrogel. The composite hydrogel sponge of the disclosure has a special porous structure of the sponge, which is beneficial to the rapid transmission and supply of water; meanwhile, the graphene on the surface of the evaporation layer can fully receive solar energy to achieve higher photo-thermal conversion efficiency.

The disclosure further provides a solar desalination device including a focusing system, a first convex lens, and a solar evaporator. Light reflected by the focusing system is irradiated onto the solar evaporator through the first convex lens. The focusing system includes a concave mirror, a second convex lens and a plane mirror sequentially arranged from bottom to top; centers of the concave mirror, the second convex lens and the plane mirror are located on a same straight line; and the straight line is perpendicular to a horizontal plane. The solar evaporator includes the composite hydrogel sponge of the above technical solutions or the composite hydrogel sponge prepared by the preparation method of the above technical solutions, an inverted V-shaped transparent glass cover and a stand. The stand includes a seawater area located in a middle and a freshwater collection area located at two ends, and the composite hydrogel sponge floats on a seawater surface of the seawater area. The focusing system can efficiently focus sunlight and irradiate the sunlight onto the solar evaporator through the first convex lens, thereby improving the utilization rate of sunlight and greatly improving the evaporation rate and efficiency of solar seawater desalination. The disclosure can realize the purpose of solar seawater desalination with environmental protection, no carbon emission and high efficiency and energy conservation.

DESCRIPTION OF REFERENCE NUMERALS

Figure 1:
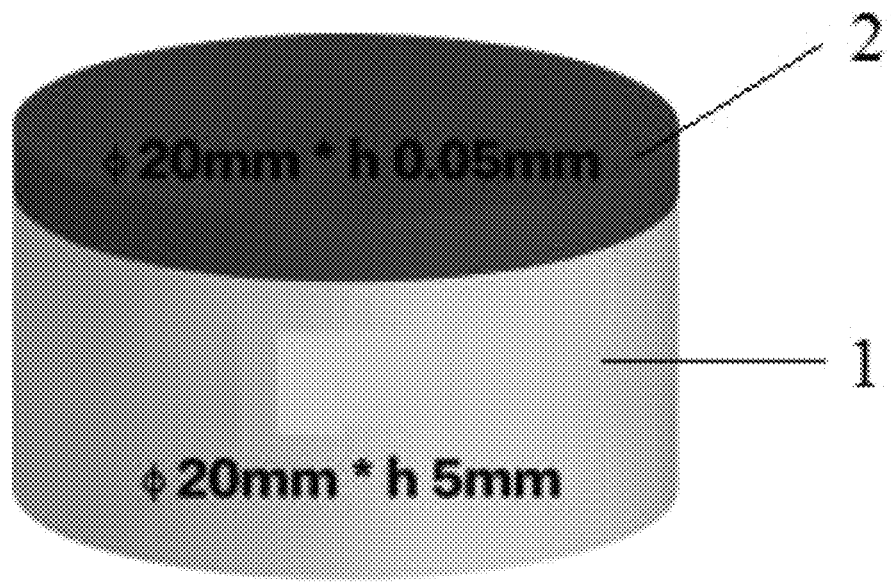
FIG. 1 illustrates a structural schematic diagram of a composite hydrogel sponge provided by the disclosure.

1—water supply layer; 2—evaporation layer; 3—concave mirror; 4—second convex lens; 5—plane mirror; 6—first convex lens; 7—inverted V—shaped transparent glass cover; 8—stand; 9—seawater area; 10—freshwater collection area; 11—focusing system; 12—composite hydrogel sponge; 13—sunlight; 14—focused sunlight; 15—condensed water; 16—water vapor.

DETAILED DESCRIPTION OF EMBODIMENTS

A composite hydrogel sponge provided by the disclosure, includes a water supply layer 1 and an evaporation layer 2 disposed on the water supply layer 1.

The material of the water supply layer 1 is polyacrylamide hydrogel.

The material of the evaporation layer 2 is polyacrylamide/graphene composite hydrogel.

The polyacrylamide/graphene composite hydrogel includes polyacrylamide hydrogel and graphene dispersed in the polyacrylamide hydrogel.

In the disclosure, a pore diameter of the water supply layer 1 can be 100 nm~500 nm, preferably 150 nm~300 nm, more preferably 180 nm~220 nm.

In the disclosure, a mass ratio of the graphene to the polyacrylamide in the evaporation layer 2 can be (0.90~1.35):(12~18), preferably (1.00~1.20):(13~16), more preferably 1.10:13.

In the disclosure, a particle size of the graphene in the evaporation layer 2 can be 0.40 nm~10.00 nm, preferably 0.50 nm~5.00 nm, more preferably 0.50 nm~3.00 nm.

In the disclosure, a pore diameter of the evaporation layer 2 can be 80 nm~200 nm, preferably 80 nm~150 nm, more preferably 80 nm~120 nm.

In the disclosure, a thickness ratio of the water supply layer 1:the evaporation layer 2 can be (50~100):1, preferably (75~100):1, more preferably 100:1.

The disclosure further provides a preparation method of the composite hydrogel sponge 12, and the preparation method includes:

mixing a first acrylamide, a first initiator, a first co-initiator, a first cross-linking agent and first water to obtain a first mixture, then performing first in-situ polymerization on the first mixture in a mold to obtain a polyacrylamide hydrogel layer; and mixing a second acrylamide, a second initiator, a second co-initiator, a second cross-linking agent, the graphene and second water to obtain a second mixture, then performing second in-situ polymerization on the second mixture on an upper surface of the polyacrylamide hydrogel layer to obtain a polyacrylamide/graphene composite hydrogel layer, thereby obtaining the composite hydrogel sponge.

In the disclosure, unless otherwise specified, all raw materials used in the preparation method are well-known commercially available products for those skilled in the art.

In the disclosure, the first acrylamide, the first initiator, the first co-initiator, the first cross-linking agent and the first water are mixed to obtain the first mixture, then the first in-situ polymerization of the first mixture is performed in the mold to obtain the polyacrylamide hydrogel layer.

In the disclosure, the first initiator can be ammonium persulfate.

In the disclosure, the first co-initiator can be N, N, N', N'-tetramethylethylenediamine.

In the disclosure, the first cross-linking agent can be N—N' methylene bisacrylamide.

In the disclosure, the first water can be distilled water.

In the disclosure, a mass ratio of the first acrylamide:the first water:the first initiator:the first co-initiator:the first cross-linking agent can be (12~18):(80~480):(0.04~0.14):(0.04~0.14):(0.0015~0.015), preferably (12~46):(80~410):(0.06~0.12):(0.06~0.12):(0.006~0.01), more preferably (12~44):(80~90):(0.07~0.08):(0.07~0.08):(0.007~0.009).

In the disclosure, the water supply layer 1 prepared according to the above ratios can keep the composite hydrogel sponge 12 in a stable semi-floating state on the seawater surface, and make the finally prepared composite hydrogel 12 sponge float on the seawater surface at a suitable height. Therefore, the seawater can be continuously supplied to the evaporation layer 2 of the composite hydrogel sponge 12 through the water supply layer 1, and the solar energy absorbed by the evaporation layer 2 can be applied to the evaporation of the seawater as much as possible, which reduces heat loss.

In the disclosure, the first acrylamide can be mixed with the first water to obtain a first pre-mixture firstly, then the first pre-mixture is mix with the first initiator, the first co-initiator, and the first cross-linking agent to obtain the first mixture. In the disclosure, the mixing is performed under stirring, and there are no special limitations on a stirring process in the disclosure. The stirring process can be performed by a process well-known to those skilled in the art.

There are no special limitations on the mold, and, a mold with a shape well-known to those skilled in the art can be used according to actual needs.

In the disclosure, a temperature of performing the first in-situ polymerization can be 35° C.~85° C., preferably 40° C.~80° C., more preferably 50° C.~60° C. A duration of performing the first in-situ polymerization can be 15 min~80 min, preferably 20 min~70 min, more preferably 60 min~70 min.

After the polyacrylamide hydrogel layer is obtained, the second acrylamide, the second initiator, the second co-initiator, the second cross-linking agent, the graphene and the second water are mixed to obtain the second mixture, the second in-situ polymerization of the second mixture is performed on the upper surface of the polyacrylamide hydrogel layer to obtain the polyacrylamide/graphene composite hydrogel layer, and thus the composite hydrogel sponge 12 is obtained.

The limitation of the types of the second initiator, the second co-initiator, and second cross-linking agent in the disclosure can be referred to the above types of the first initiator, the first co-initiator, and the first cross-linking agent, and will not be repeated here.

In the disclosure, a particle size of the graphene in the evaporation layer can 0.40 nm~10.00 nm, preferably 0.50 nm~5.00 nm, more preferably 0.50 nm~3.00 nm. In the disclosure, the second water can be distilled water.

In the disclosure, a mass ratio of the graphene:the second acrylamide:the second water:the second initiator:the second co-initiator:the second cross-linking agent can be (0.90~1.35):(12~18):(80~118):(0.04~0.14):(0.04~0.14):(0.0015~0.015), preferably (1.0~1.30):(13~16):(80~90):(0.06~0.12):(0.06~0.12):(0.002~0.01), more preferably 1.10:13:85:0.07:0.07:0.008.

In the disclosure, the second acrylamide can be mixed with the second water to obtain a second pre-mixture firstly, then the second pre-mixture is mix with the second initiator, the second co-initiator, the second cross-linking agent and the graphene to obtain the second mixture. In the disclosure, the mixing is performed under stirring, and there are no special limitations on a stirring process in the disclosure. The stirring process can be performed by a process well-known to those skilled in the art.

In the disclosure, a temperature of performing the second in-situ polymerization can be 35° C.~85° C., preferably 40° C.~80° C., more preferably A duration of performing the second in-situ polymerization can be min~80 min, preferably 20 min~70 min, more preferably 60 min~70 min.

The disclosure further provides the application of the composite hydrogel sponge 12 of the technical solutions or the composite hydrogel sponge 12 prepared by the preparation method of the technical solutions in the field of seawater desalination.

The disclosure further provides a solar desalination device including a focusing system 11, a first convex lens 6, and a solar evaporator. The focusing system 11 is configured to reflect light to irradiate onto the solar evaporator through the first convex lens 6.

The focusing system 11 includes a concave mirror 3, a second convex lens 4 and a plane mirror 5 sequentially arranged from bottom to top; centers of the concave mirror 3, the second convex lens 4 and the plane mirror 5 are located on a same straight line, and the straight line is perpendicular to a horizontal plane.

The solar evaporator includes the composite hydrogel sponge 12 of the above technical solutions or the composite hydrogel sponge 12 prepared by the preparation method of the above technical solutions, an inverted V-shaped transparent glass cover 7 and a stand 8. The stand 8 includes a seawater area 9 located in a middle of the stand 8 and a freshwater collection area 10 located at two ends of the stand 8, and the composite hydrogel sponge 12 is configured to float on a seawater surface of the seawater area 9.

In the disclosure, a diameter of the first convex lens 6 is 1.2~1.3 times of a diameter of the light reflected by the focusing system 11. In the disclosure, the first convex lens 6 can be a Fresnel lens which has a better focusing effect. The light beam evenly irradiated on the composite hydrogel sponge 12 by adjusting parameters such as the angle of the plane mirror 5 and the groove spacing of the Fresnel lens.

In the disclosure, a diameter of the concave mirror 3 can be 3~10 times, preferably 4~8 times, more preferably 5~6 times of a diameter of the composite hydrogel sponge 12.

In the disclosure, a curvature radius of the concave mirror 3 can be in a range of ⅔~1 times of a length of an optical axis between a vertex of the concave mirror 3 and the composite hydrogel sponge 12. In the disclosure, the curvature radius of the concave mirror 3 is controlled within the above range can reduce the curvature of the concave mirror 3, thereby reducing the cost of the focusing system 11.

In the disclosure, the second convex lens 4 is located at a height in a range of ⅓~½ times of the curvature radius of the concave mirror 3. In the disclosure, a position of the second convex lens 4 is controlled within the above range can reduce a central shading area in the focusing system 11.

In the disclosure, the seawater area 9 is configured to accommodate seawater to be desalinated, and the freshwater collection area 10 is configured to collect freshwater obtained by reflux after evaporation and condensation.

In the disclosure, a thickness of the composite hydrogel sponge 12 can be mm, and a height of the composite hydrogel sponge 12 soaked in seawater can be 2 mm~4 mm.

In the disclosure, a process of performing seawater desalination by the solar desalination device: after the sunlight 13 passes through a non-shading area and vertically irradiates onto the surface of the concave mirror 3, the sunlight 13 is reflected to pass through the second convex lens 4 and refract to the plane mirror in turn, and then the sunlight 13 is reflected by the plane mirror 5 to the first convex lens 6 (Fresnel lens) for focusing the sunlight 13. The sunlight 13 passes through an inverted V-shaped transparent glass cover 7 and irradiate onto the composite hydrogel sponge 12 to evaporate the seawater. The water vapor 16 generated by evaporation rises to the inverted V-shaped transparent glass cover 7 and condenses into condensed water 15, and the condensed water 15 is refluxed to the freshwater collection area 10 for the collection of freshwater.

The composite hydrogel sponge 12 and its preparation method and application, and the solar desalination device are described in detail below in combination with embodiments, but the embodiments cannot be understood as a limitation to the scope of protection of the disclosure.

Embodiment 1

12 grams (g) of acrylamide is dissolved in 85 g of distilled water to obtain an acrylamide aqueous solution, then 0.06 g of ammonium persulfate, 0.06 g of N, N, N', N'-tetramethylethylenediamine and 0.0075 g of N—N' methylenebisacrylamide are added into the obtained acrylamide aqueous solution to obtain a first mixture. After the first mixture is mixed evenly, the first mixture is poured into a cylindrical mold with a diameter of 20 mm, and the first mixture is polymerized (that is, first in-situ polymerization) at a temperature of 60° C. for min to obtain a polyacrylamide hydrogel column. A polyacrylamide hydrogel column with a height of 5 mm is cut out as a water supply layer 1 with a pore diameter of 180 nm~220 nm.

12 g of acrylamide is dissolved in 85 g of distilled water to obtain an acrylamide aqueous solution, then 1 g of graphene with a particle size of 0.50 nm~3.00 nm, 0.06 g of ammonium persulfate, 0.06 g of N, N, N', N'-tetramethylethylenediamine and 0.0075 g of N—N' methylenebisacrylamide are added into the obtained acrylamide aqueous solution to obtain a second mixture. After the second mixture is mixed evenly, the second mixture is coated on an upper surface of the water supply layer 1, and the second mixture coated on the upper surface of the water supply layer 1 is polymerized (that is, second in-situ polymerization) at a temperature of 60° C. for 60 min to obtain a polyacrylamide/graphene composite hydrogel column. A polyacrylamide/graphene column with a height of 0.05 mm is cut out as an evaporation layer 2 with a pore diameter of 80 nm~120 nm. Therefore, a composite hydrogel sponge 12 is obtained and a structure of the composite hydrogel sponge 12 is illustrated in FIG. 1.

Embodiment 2

13 g of acrylamide is dissolved in 85 g of distilled water to obtain an acrylamide aqueous solution, then 0.07 g of ammonium persulfate, 0.07 g of N, N, N', N'-tetramethylethylenediamine and 0.008 g of N—N' methylenebisacrylamide are added into the obtained acrylamide aqueous solution to obtain a first mixture. After the first mixture is mixed evenly, the first mixture is poured into a cylindrical mold with a diameter of 20 mm, and the first mixture is polymerized (that is, first in-situ polymerization) at a temperature of 55° C. for 65 min to obtain a polyacrylamide hydrogel column. A polyacrylamide hydrogel column with a height of 5 mm is cut out as a water supply layer 1 with a pore diameter of 180 nm~220 nm.

13 g of acrylamide is dissolved in 85 g of distilled water to obtain an acrylamide aqueous solution, then 1.1 g of graphene with a particle size of 0.50 nm~3.00 nm, 0.07 g of ammonium persulfate, 0.07 g of N, N, N', N'-tetramethylethylenediamine and 0.008 g of N—N' methylenebisacrylamide are added into the obtained acrylamide aqueous solution to obtain a second mixture. After the second mixture is mixed evenly, the second mixture is coated on an upper surface of the water supply layer 1, and the second mixture coated on the upper surface of the water supply layer 1 is polymerized (that is, second in-situ polymerization) at a temperature of 55° C. for 65 min to obtain a polyacrylamide/graphene composite hydrogel column. A polyacrylamide/graphene column with a height of 0.05 mm is cut out as an evaporation layer 2 with a pore diameter of 80 nm~120 nm. Therefore, a composite hydrogel sponge 12 is obtained and a structure of the composite hydrogel sponge 12 is illustrated in FIG. 1.

Embodiment 3

15 g of acrylamide is dissolved in 85 g of distilled water to obtain an acrylamide aqueous solution, then 0.075 g of ammonium persulfate, 0.075 g of N, N, N', N'-tetramethylethylenediamine and 0.0010 g of N—N' methylenebisacrylamide are added into the obtained acrylamide aqueous solution to obtain a first mixture. After the first mixture is mixed evenly, the first mixture is poured into a cylindrical mold with a diameter of 20 mm, and the first mixture is polymerized (that is, first in-situ polymerization) at a temperature of 50° C. for 70 min to obtain a polyacrylamide hydrogel column. A polyacrylamide hydrogel column with a height of 5 mm is cut out as a water supply layer 1 with a pore diameter of 180 nm~220 nm.

15 g of acrylamide is dissolved in 85 g of distilled water to obtain an acrylamide aqueous solution, then 1.2 g of graphene with a particle size of 0.50 nm~3.00 nm, 0.075 g of ammonium persulfate, 0.075 g of N, N, N', N'-tetramethylethylenediamine and 0.010 g of N—N' methylenebisacrylamide are added into the obtained acrylamide aqueous solution to obtain a second mixture. After the second mixture is mixed evenly, the second mixture is coated on an upper surface of the water supply layer 1, and the second mixture coated on the upper surface of the water supply layer 1 is polymerized (that is, second in-situ polymerization) at a temperature of 50° C. for 70 min to obtain a polyacrylamide/graphene composite hydrogel column. A polyacrylamide/graphene column with a height of 0.05 mm is cut out as an evaporation layer 2 with a pore diameter of 80 nm~120 nm. Therefore, a composite hydrogel sponge 12 is obtained and a structure of the composite hydrogel sponge 12 is illustrated in FIG. 1.

Embodiment 4

Figure 2:
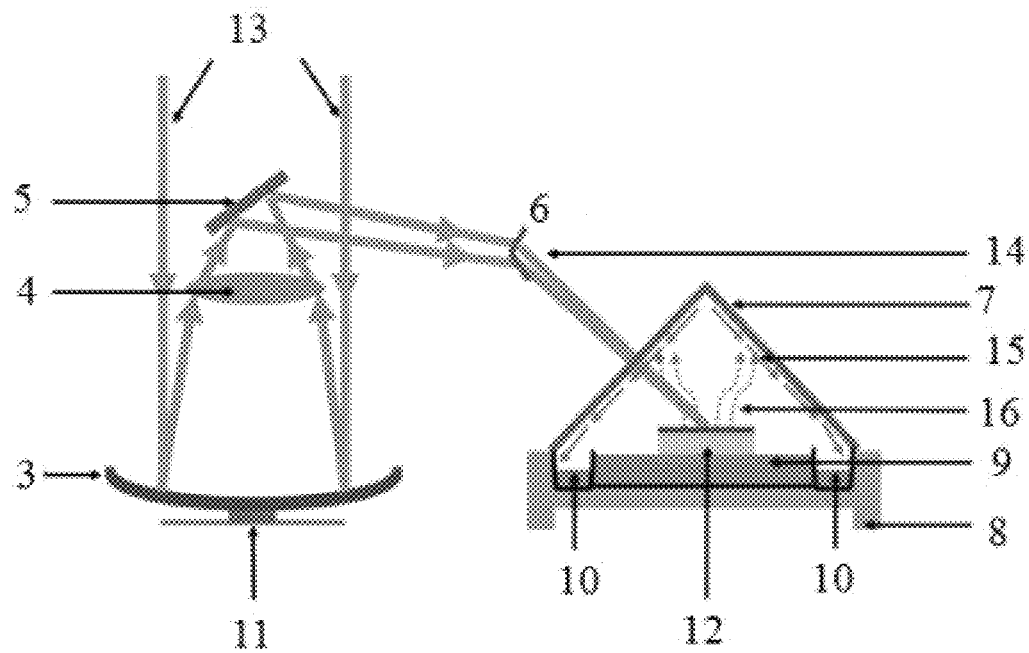
FIG. 2 illustrates a solar desalination device provided by the disclosure.

A solar desalination device provided by the disclosure is assembled according to the structure in FIG. 2. The solar desalination device includes a focusing system 11, a Fresnel Lens (that is, a first convex lens 6), and a solar evaporator. The focusing system 11 is configured to reflect light to irradiate onto the solar evaporator through the Fresnel Lens. The focusing system 11 includes a concave mirror 3, a second convex lens 4 and a plane mirror 5 sequentially arranged from bottom to top; centers of the concave mirror 3, the second convex lens 4 and the plane mirror 5 are located on a same straight line, and the straight line is perpendicular to a horizontal plane. The solar evaporator includes the composite hydrogel sponge 12 prepared in Embodiment 1, an inverted V-shaped transparent glass cover 7 and a stand 8, and the stand 8 includes a seawater area 9 located in a middle of the stand 8 and a freshwater collection area 10 located at two ends of the stand 8; and the composite hydrogel sponge 12 floats on a seawater surface of the seawater area 9.

A diameter of the concave mirror 3 is 5 times of a diameter of the composite hydrogel sponge 12. A curvature radius of the concave mirror 3 is ⅔ times of a length of an optical axis between a vertex of the concave mirror 3 and the composite hydrogel sponge 12. The second convex lens 4 is located at a height of 0.5 times of the curvature radius of the concave mirror 3. A diameter of the Fresnel lens 6 is 1.2 times of a diameter of the light reflected by the focusing system 11.

Each seawater area 9 of the Embodiment 1-4 is filled with seawater to be desalinated. The composite hydrogel sponge 12 is configured to float on the surface of the seawater in a semi-floating state (a height of the composite hydrogel sponge 12 soaked in the seawater is a range of 2 mm~4 mm).

Seawater desalination effects of the Embodiments 1-4 are tested by following tests.

Each composite hydrogel sponge 12 (placed in the inverted V-shaped transparent glass cover 7) of the Embodiments 1 to 3 is directly and continuously irradiated with simulated sunlight 13 (that is, a simulated sun simulated by a solar energy simulator with an optical density of 1 kilowatt per square meter ($kW/m^2$)). The water vapor 16 after seawater evaporation rises to the inverted V-shaped transparent glass cover 7 and condenses into condensed water 15, then the condensed water 15 is refluxed to the freshwater collection area 10 for collecting freshwater, so as to realize desalination of the seawater.

Simulated sunlight 13 (that is, a simulated sun simulated by a solar energy simulator with an optical density of 1 $kW/m^2$) continuously irradiates the concave mirror 3 of the focusing system 11 in the Embodiment 4, the simulated sunlight 13 is focused through the focusing system 11, then the simulated light 13 is reflected by the plane mirror 5 to the Fresnel lens for focusing and forming focused sunlight 14 (an optical density of the focused sunlight 14 can reach 3~5 times of the optical density of the simulated sunlight 13), and the focused sunlight 14 irradiates onto the composite hydrogel sponge 12 through the inverted V-shaped transparent glass cover 7 for evaporation, water vapor 16 obtained by the evaporation rises to the inverted V-shaped transparent glass cover 7 and condenses into condensed water 15, and then the condensed water 15 is refluxed to the freshwater collection area 10 for collecting freshwater, thereby achieving desalination of the seawater.

An evaporation rate (that is, freshwater production obtained by measuring the weight change of the seawater within 60 minutes using an electronic balance under a stable condition) and evaporation efficiency are used to evaluate tests of the Embodiments 1-4, and the tests of Embodiments 1-3 are performed without the focusing system 11. The evaporation efficiency is calculated by a formula: $Q=(sH)/(qc)\times 100\%$; where s represents the evaporation rate whose unit is $kg/m^2 \cdot h$, H represents the phase transition enthalpy whose unit is 0.423 Whig or 1.52 kJ/g, q represents an optical density (1 $kW/m^2$) of a simulated sun, and c represents the number of simulated suns and c is equal to 1 in the Embodiments 1-4.

The result of the tests: an evaporation rate of the Embodiment 1 is 2.20 $kg/m^2 \cdot h$, and evaporation efficiency is 93.1%. An evaporation rate of the Embodiment 2 is 2.24 $kg/m^2 \cdot h$, and evaporation efficiency is 94.8%. An evaporation rate of the Embodiment 3 is 2.30 $kg/m^2 \cdot h$, and evaporation efficiency is 97.3%. An evaporation rate of the Embodiment 4 is 4.35 $kg/m^2 \cdot h$, and evaporation efficiency is 184.0%. From the result, it can be seen that with direct irradiation of one simulated sun (that is, the simulated sunlight 13 with an optical density of 1 $kW/m^2$), each evaporation rate of the Embodiment 1-3 is only in a range of 2.20-2.30 $kg/m^2 \cdot h$. However, in the Embodiment 4, the simulated sunlight 13 of one simulated sun is focused, and the optical density of the focused sunlight 14 will reach 3-5 times of the optical density of the simulated sunlight 13. The evaporation rate of the Embodiment 4 increases to 4.35 $kg/m^2 \cdot h$ which is higher than the evaporation rate of one simulated sun without focusing the simulated sunlight 13.

After continuous irradiation for 60 minutes, concentrations of sodium ions, magnesium ions, potassium ions, and calcium ions in seawater before and after desalination are tested. The result of the tests indicates that the concentrations of sodium ions, magnesium ions, potassium ions, and calcium ions in untreated seawater are 11700 parts per million (ppm), 6530 ppm, 435 ppm, and 368 ppm, respectively. The concentrations of sodium ions, magnesium ions, potassium ions, and calcium ions in the seawater treated by the Embodiment 1 is 8.56 ppm, 5.38 ppm, 1.82 ppm, and 1.73 ppm, respectively. The concentrations of sodium ions, magnesium ions, potassium ions, and calcium ions in the seawater treated by the Embodiment 2 is 8.32 ppm, 5.61 ppm, 1.81 ppm, and 1.86 ppm, respectively. The concentrations of sodium ions, magnesium ions, potassium ions, and calcium ions in the seawater treated by the Embodiment 3 is 8.43 ppm, 5.39 ppm, 1.93 ppm, and 1.79 ppm, respectively. The concentrations of sodium ions, magnesium ions, potassium ions, and calcium ions in the seawater treated by the Embodiment 4 is 8.45 ppm, 5.42 ppm, 1.86 ppm, and 1.78 ppm, respectively. It can be seen that the salt-removal rate in the water (that is, freshwater in the freshwater collection area 10) after desalination treatment by the solar desalination device provided by the disclosure reaches 99.9%.

The above are only a part of embodiments of the disclosure. It should be noted that for those skilled in the art, improvements and changes can be made without departing from the principles of the disclosure. These improvements and changes should also belong to the scope of protection of the disclosure.

What is claimed is:

1. A solar desalination device, comprising a focusing system, a first convex lens, and a solar evaporator;

wherein the focusing system is configured to reflect light to irradiate onto the solar evaporator through the first convex lens;

wherein the focusing system comprises a concave mirror, a second convex lens and a plane mirror sequentially arranged from bottom to top; centers of the concave mirror, the second convex lens and the plane mirror are located on a same straight line, and the straight line is perpendicular to a horizontal plane;

wherein the solar evaporator comprises a composite hydrogel sponge, an inverted V-shaped transparent glass cover and a stand; the stand comprises a seawater area located in a middle and a freshwater collection area located at two ends; and the composite hydrogel sponge is configured to float on a seawater surface of the seawater area;

wherein a diameter of the concave mirror is 3~10 times of a diameter of the composite hydrogel sponge;

wherein a curvature radius of the concave mirror is ⅔~1 times of a length of an optical axis between a vertex of the concave mirror and the composite hydrogel sponge;

wherein the second convex lens is located at a height of ⅓~½ times of the curvature radius of the concave mirror;

wherein a diameter of the first convex lens is 1.2~1.3 times of a diameter of the light reflected by the focusing system;

wherein the composite hydrogel sponge comprises a water supply layer and an evaporation layer disposed on the water supply layer;

wherein a material of the water supply layer is polyacrylamide hydrogel;

wherein a material of the evaporation layer is polyacrylamide/graphene composite hydrogel; and wherein the polyacrylamide/graphene composite hydrogel comprises polyacrylamide hydrogel and graphene dispersed in the polyacrylamide hydrogel.

2. The solar desalination device according to claim 1, wherein a mass ratio of the graphene to the polyacrylamide in the evaporation layer is (0.90~1.35):(12~18).

3. The solar desalination device according to claim 1, wherein a particle size of the graphene in the evaporation layer is in a range of 0.40 nanometers (nm) to 10.00 nm.

4. The solar desalination device according to claim 1, wherein a preparation method of the composite hydrogel sponge comprises:

mixing a first acrylamide, a first initiator, a first co-initiator, a first cross-linking agent and first water to obtain a first mixture, then performing first in-situ polymerization on the first mixture in a mold to obtain a polyacrylamide hydrogel layer; and mixing a second acrylamide, a second initiator, a second co-initiator, a second cross-linking agent, the graphene and second water to obtain a second mixture, then performing second in-situ polymerization on the second mixture on an upper surface of the polyacrylamide hydrogel layer to obtain a polyacrylamide/graphene composite hydrogel layer, thereby obtaining the composite hydrogel sponge.

5. The solar desalination device according to claim 4, wherein a mass ratio of the first acrylamide:the first water:the first initiator:the first co-initiator:the first cross-linking agent is (12~18):(80~180):(0.04~0.14):(0.04~0.14):(0.0015~0.015); and wherein a mass ratio of the graphene:the second acrylamide:the second water:the second initiator:the second co-initiator:the second cross-linking agent is (0.90~1.35):(12~18):(80~118):(0.04~0.14):(0.04~0.14):(0.0015~0.015).

6. The solar desalination device according to claim 4, wherein a temperature of performing the first in-situ polymerization is in a range of 35 Celsius degrees (° C.) to 85° C. and a duration of performing the first in-situ polymerization is in a range of 15 minutes (min) to 80 min, and a temperature of performing the second in-situ polymerization is in a range of 35° C. to 85° C. and a duration of performing the second in-situ polymerization is in a range of 15 min to 80 min.

7. The solar desalination device according to claim 1, wherein a thickness of the composite hydrogel sponge is 5.05 millimeters (mm), and a height of the composite hydrogel sponge soaked in seawater is in a range of 2 mm to 4 mm.

* * * * *